2,703,279

ORGANIC ACID DIGESTION OF LIGNOCELLULOSE

Stanley Charles Bate, Francis George Peach, and Walter Alan Rogerson, Spondon, near Derby, England, assignors to British Celanese Limited, a corporation of Great Britain No Drawing. Application May 6, 1950,
Serial No. 160,588

Claims priority, application Great Britain May 31, 1949

5 Claims. (Cl. 92—9)

This invention relates to the production of cellulose from ligno-cellulosic materials.

According to the invention cellulose is obtained by heating ligno-cellulosic materials, especially wood, with an alpha-hydroxy-carboxylic acid or a dehydrated derivative of an alpha-hydroxy-carboxylic acid in the liquid phase. By "dehydrated derivatives" we mean compounds and mixtures of compounds obtainable from alpha-hydroxy-carboxylic acids by the elimination of water, such as anhydrides and compounds resulting from self-esterification, e. g. lactides. As is well known, the majority of alpha-hydroxy-carboxylic acids when heated readily lose water to form such dehydrated derivatives, and the invention includes processes in which reactions of this kind involving the loss of water occur after the alpha-hydroxy-carboxylic acid and the wood or other ligno-cellulosic material have been brought into contact, as well as processes in which one or more of the dehydrated derivatives are initially present with or without the acid itself.

Advantageously we employ water-soluble alpha-hydroxy-carboxylic acids, especially such as contain up to eight carbon atoms, and/or water-soluble dehydrated derivatives of such acids. Examples of such acids are glycollic acid, lactic acid, alpha-hydroxy-butyric acid, alpha-hydroxy-isobutyric acid, alpha-hydroxy-caprylic acid, malic acid, tartaric acid and citric acid; of these we prefer to employ glycollic acid and lactic acid. The acid specified may be partly or wholly replaced by dehydrated derivatives thereof.

The alpha-hydroxy-carboxylic acid or dehydrated derivative thereof may be employed alone (provided it is liquid under the treatment conditions) but is preferably diluted or mixed with another compound. (The use of the term "diluted" is not intended to imply anything regarding the part played by the diluent in the process; it may or may not by itself have some power of dissolving lignin or other non-cellulosic constituents from the material being treated.) It is advantageous that the mixture of diluent and alpha-hydroxy-carboxylic acid or dehydrated derivative thereof should be liquid at ordinary temperatures. The diluent may be water or an organic liquid, preferably such that the mixture boils at or above the desired treatment temperature so as to avoid the necessity for using a pressure vessel. Examples of good organic diluents are unsubstituted carboxylic acids containing not more than four carbon atoms, especially acetic acid; esters of suitable boiling point, e. g. ethyl valerate (normal or iso-) and ethyl chloracetate; and mono-, di-, or polyhydric alcohols, especially the amyl alcohols, ethylene glycol, and di- and tri-ethylene glycol. More than one diluent can if desired be used; for example the mixture may contain both water and an organic diluent, especially when the organic diluent contains an alcoholic hydroxyl group or groups. Moreover if the free acid is initially present, some water will in many cases be split off during the treatment in the formation of a dehydrated derivative as already described, and such water is preferably retained in the mixture. Lower boiling diluents, e. g. ethyl alcohol or acetone, can be used if desired, but it will then be necessary to work under pressure.

The concentration of the alpha-hydroxy-carboxylic acid or dehydrated derivative thereof in the mixture depends to some extent on the nature of the diluent. When water is the sole or preponderating diluent, the concentration is preferably above 60% and especially between 65% and 85% (dehydrated derivatives being reckoned as the free acid). With organic diluents a wider range of concentrations is suitable; in particular concentrations of 25%–85% and especially about 30%–70% are suitable.

The temperature of the treatment is preferably above 110° C. and especially between 115° C. and 150° C. or 170° C.; generally we prefer to employ temperatures in the neighbourhood of 125°–145° C. In any case the temperature employed should not be such that the alpha-hydroxy-carboxylic acid undergoes a decomposition other than dehydration; similarly if a diluent containing one or more alcoholic hydroxyl groups is used, it is preferable not to allow the temperature to exceed 150° C., and also to have some water present throughout or during the greater part of the process, so as to suppress any tendency to esterification of the acid by the diluent. If a diluent of suitable boiling point is used (e. g. water or acetic acid) the mixture may be boiled under reflux at atmospheric pressure. Higher pressures may if desired be employed in order to make possible the use of temperatures higher than can be reached at atmospheric pressure, although it is usually better for this purpose to choose a higher boiling diluent; higher pressures are of course necessary if the boiling point of the diluent is such that the mixture boils below the desired treatment temperature.

The time required for the treatment will vary with the type of wood or other material being treated as well as with the temperature and the precise nature of the treating agent. (We include in the term "treating agent" not only the alpha-hydroxy-carboxylic acid, but also any diluent or diluents employed therewith.) When a boiling mixture of glycollic acid (including dehydrated derivatives thereof) and acetic acid is used the treatment may require between about 3 and 10 hours with deciduous woods such as poplar and beech, and somewhat longer, e. g. 12–24 hours, with coniferous woods such as spruce and larch.

The treatment is preferably continued until substantially no more lignin will dissolve in the treating agent; the crude cellulose remaining (the purity of which compares favourably with that of crude cellulose produced by the sulphite, soda or sulphate process) may then be separated, preferably by a method such as filtration or decantation in which the alpha-hydroxy-carboxylic acid or dehydrated derivative thereof is not further diluted. The cellulose may then be thoroughly washed. Advantageously further quantities of the diluent are used to wash the cellulose and washing is continued until the cellulose is substantially free from the alpha-hydroxy-carboxylic acid and dehydrated derivatives thereof; the diluent may itself then be washed out of the cellulose, e. g. with water or a volatile organic solvent, for example acetone or alcohol. When water itself is employed as the diluent this last wash is of course not required. The washed cellulose may if desired be given a purification treatment; for example it may be given one or more bleaches with a hypochlorite or sodium chlorite solution or other bleaching agent, and is preferably also treated with an alkali solution to remove hemi-celluloses; advantageously it may be treated with a warm 15–22% solution of caustic soda as described in U. S. applications S. No. 75963, filed February 11, 1949, and S. No. 154,886, filed April 8, 1950, now U. S. Patents Nos. 2,645,576 and 2,645,577, issued July 14, 1953, respectively, or it may be given one of the other purification treatments referred to in U. S. application S. No. 154,886, filed April 8, 1950.

The alpha-hydroxy-carboxylic acid or dehydrated derivative thereof and the diluent may be recovered in any suitable manner and used again in the process. For example when a mixture of glycollic acid (including dehydrated derivatives thereof) and acetic acid has been employed and the cellulose, after it has been separated from the acids by filtration or decantation, has been washed with further acetic acid, the filtrate and washings may be mixed and (if desired after part of the acetic acid has been removed by distillation under atmospheric or reduced pressure) may be diluted with a sufficiently large proportion of water to precipitate the lignin. The mixture of aqueous acids and precipitated lignin may then be heated to agglomerate the lignin, after which the aqueous acids may be separated from the lignin, for example by filtration or decantation. The acids may then be distilled until substantially all the water has been removed together with at least part of the acetic acid, and the aqueous acetic acid obtained as distillate may be concentrated, for example by extraction with a mixture of ethyl acetate and benzene. The residue, comprising glycollic acid with or without some acetic acid, remaining in the still may be used again in the process, as may the re-concentrated acetic acid obtained from the distillate. Processes on similar lines may be employed when other alpha-hydroxy-carboxylic acids or dehydrated derivatives thereof and/or other diluents have been used.

While the new process is applicable to various types of ligno-cellulosic material, including cereal straws and the residues of other annual plants, it is particularly useful and its advantages are most apparent in the treatment of woods, including both coniferous and deciduous woods, for example spruce, larch, fir, poplar and beech. It is found that the yields of cellulose obtained are greater than those obtained when pulping by a conventional alkali type process such as the soda or sulphate process following a dilute acid pre-hydrolysis; moreover the quality of the cellulose obtained, as determined by the alpha-cellulose and pentosan contents and also by the clarity and viscosity of cellulose acetate made therefrom, is in many cases higher. When cereal straws are to be treated they may with advantage first be given a boil with a dilute alkali solution, e. g. an open boil with a 1–5% caustic soda solution, which in turn may if desired be preceded by an open boil with a dilute acid solution, e. g. a 1–2% hydrochloric or sulphuric acid solution.

The invention is illustrated by the following examples.

*Example 1*

Poplar chips were boiled at atmospheric pressure for 4 hours with about 6 times their weight of a mixture of glycollic acid and acetic acid in a ratio of about 2:1 (by weight). The crude cellulose was then separated from the acids by filtration, and washed first with a concentrated acetic acid until it was free from glycollic acid, and subsequently with water until free from acetic acid. It was then bleached twice with hypochlorite, washed, and purified with an alkali solution to remove pentosans. The yield of purified cellulose was 38.1%, and it had an alpha-cellulose content of 97% and a pentosan content of 1.78%. The corresponding figures for a purified cellulose obtained from the same wood by giving the same bleach and purification treatment to the crude product obtained by acid pre-hydrolysis followed by a conventional soda pulping were: Yield of purified cellulose 34.4%; alpha-cellulose 95.8%; pentosan 1.38%. In this and the other examples the glycollic acid, made by the hydrolysis of chloracetic acid, was obtained in the form of a syrupy liquid, being actually a mixture containing one or more dehydrated derivatives of the acid. As its exact composition is not known, it is referred to throughout the examples as glycollic acid, and the proportions given are based on the equivalent amount of glycollic acid as nearly as can be estimated.

*Example 2*

The process of Example 1 was repeated except that the wood was boiled for 6 hours with an approximately 1:2 (by weight) glycollic acid/acetic acid mixture. The yield of purified cellulose was 42.1%, its alpha-cellulose content was 96.8%, and its pentosan content 2.69%.

*Example 3*

Spruce chips were boiled at atmospheric pressure with about 6 times their weight of an approximately 1:1 (by weight) glycollic acid/acetic acid mixture for 15 hours, and the cellulose separated, bleached and purified as in Example 1. The yield of purified cellulose was 39.1%, its alpha-cellulose content 95.2% and its pentosan content 1.70%. The soda pulping process gave a yield of 33.2% of purified cellulose, having an alpha-cellulose content of 93.2% and a pentosan content of 1.38%.

*Example 4*

Chopped straw was given an open boil with a 2% caustic soda solution, and after being washed free from alkali was boiled with about 6 times its original weight of an approximately 2:1 (by weight) glycollic acid/acetic acid mixture. The cellulose was separated, bleached and purified as described in Example 1. The yield of purified cellulose was 30.1%, its alpha-cellulose content was 96.6% and its pentosan content 3.15%. Acid mixtures containing a higher proportion of acetic acid gave somewhat higher yields of cellulose having a considerably higher pentosan content.

Following the processes described in the foregoing examples, the acids were recovered by the following procedure. The first filtrate and the concentrated acetic acid washings were mixed and distilled up to a still base temperature of 140° C., the distillate being employed as the concentrated acetic acid for washing a subsequent batch of cellulose. The residue remaining in the still was diluted with 4 to 5 times its weight of the water washings from the cellulose so as to precipitate the lignin; the mixture was heated to 70°–80° C. to agglomerate the lignin, which was then separated by filtration or decantation. The liquor remaining was again distilled up to 140° C. to separate the water and acetic acid, leaving the glycollic acid as residue. The distillate could either be treated at once to recover the acetic acid, or it could be used in an intermediate wash for the cellulose and the washings treated to recover the acetic acid, for example by extraction with a mixture of ethyl acetate and benzene.

While the examples describe the preferred form of the invention, in which the treating agent is a mixture of glycollic acid and acetic acid, other mixtures can also be used. Examples of such mixtures are:

Lactic acid 1 part, acetic acid 2 parts.
Glycollic acid 1 part, ethylene glycol 1 part.
Glycollic acid 1 part, mixed amyl alcohols 1 part.
Lactic acid 2 parts, mixed amyl alcohols 1 part.
Glycollic or lactic acid 3 parts, mixed amyl alcohols or ethylene glycol 2 parts, water 1 part.

All the "parts" are by weight. The amount of the mixture (by weight) is the same as in any of Examples 1–4; the temperature is the reflux temperature in those cases where boiling takes place below about 140° C.; in the other cases temperatures between 130° and 140° C. are used.

Having described our invention, what we desire to secure by Letters Patent is:

1. Process for the production of cellulose from ligno-cellulosic material, which comprises heating the material within the range of 110° and 175° C. with a homogeneous mixture of a substance selected from the group which consists of aliphatic alpha-hydroxy acids containing 2 to 8 carbon atoms in the molecule and the anhydrides and lactides of such acids, and as a diluent substance an unsubstituted monocarboxylic aliphatic acid containing at most 4 carbon atoms in the molecule, the proportion of the substance of said group in the mixture being 25–85%, reckoned as the acid, and heating being continued until substantially no more lignin dissolves.

2. Process according to claim 1, wherein the alpha-hydroxy aliphatic acid is glycollic acid and the diluent is acetic acid.

3. Process according to claim 1, wherein the alpha-hydroxy aliphatic acid is lactic acid and the diluent is acetic acid.

4. Process according to claim 2, wherein the material is heated with said mixture within the range of 125° to 150° C.

5. Process according to claim 3, wherein the material is heated with the acid mixture within the range of 125° to 150° C.

References Cited in the file of this patent

UNITED STATES PATENTS

| | | |
|---|---|---|
| 38,020 | Allen | Mar. 31, 1863 |
| 1,658,213 | Strecker | Feb. 7, 1928 |
| 1,705,424 | Strecker | Mar. 12, 1929 |
| 1,923,292 | Bassett | Aug. 22, 1933 |
| 2,070,585 | Dreyfus | Feb. 16, 1937 |

FOREIGN PATENTS

| | | |
|---|---|---|
| 329,566 | Germany | Nov. 23, 1920 |

(Other references on following page)

OTHER REFERENCES

D'Orby, Paper Industry and Paper World, November 1940, p. 862.

Wood Chemistry by Wise, p. 433 (1944), published by Reinhold Publishing Corp., New York.

Schutz, Cellulosechemi, Jahr 18, Heft 4, pp. 76-83 (1940).

Report on the III International Conference on Timber Utilization, July 26-28, 1937, No. 16/17 Special No., pp. 94-96.

The Paper Industry and Paper World, August 1943, pp. 558, 559.